US008454036B2

(12) United States Patent
Cowie et al.

(10) Patent No.: US 8,454,036 B2
(45) Date of Patent: Jun. 4, 2013

(54) TOOL KIT MOUNTING SYSTEM

(75) Inventors: Charles Henry Cowie, Jonesboro, AR (US); Tobias Mckay Bridges, Shrewsbury, PA (US); Richard Rex Bottles, Jonesboro, AR (US)

(73) Assignee: Apex Brands, Inc., Sparks, MD (US)

( * ) Notice: Subject to any disclaimer, the term of this patent is extended or adjusted under 35 U.S.C. 154(b) by 204 days.

(21) Appl. No.: 13/109,474

(22) Filed: May 17, 2011

(65) Prior Publication Data

US 2012/0292870 A1    Nov. 22, 2012

(51) Int. Cl.
*B62B 5/00* (2006.01)
(52) U.S. Cl.
USPC ........................................ 280/79.3; 248/224.8
(58) Field of Classification Search
CPC . B65D 19/42; B65D 19/44; B65D 2519/00024
USPC ........ 280/79.3, 47.34, 79.11, 79.7; 211/70.6, 211/126.2, 188, 194, 4; 312/349, 321, 280; 248/499, 500, 505, 506, 224.8
See application file for complete search history.

(56) References Cited

U.S. PATENT DOCUMENTS

| | | | | |
|---|---|---|---|---|
| 332,360 | A * | 12/1885 | Penney | 312/294 |
| 3,610,429 | A * | 10/1971 | MacKay | 211/126.15 |
| 4,249,684 | A | 2/1981 | Miller et al. | |
| 4,535,897 | A | 8/1985 | Remington et al. | |
| 4,630,739 | A * | 12/1986 | Levenberg | 211/189 |
| 4,944,416 | A * | 7/1990 | Petersen et al. | 52/36.5 |
| 4,961,295 | A * | 10/1990 | Kosch et al. | 52/36.5 |
| 5,406,894 | A * | 4/1995 | Herrmann et al. | 108/108 |
| 5,582,269 | A | 12/1996 | Gugel et al. | |
| 5,628,534 | A * | 5/1997 | Morgan | 292/128 |
| 5,687,856 | A * | 11/1997 | Kendrena | 211/70.6 |
| 5,730,414 | A * | 3/1998 | Wenger et al. | 248/503 |
| 5,899,544 | A * | 5/1999 | James et al. | 312/198 |
| 5,913,380 | A | 6/1999 | Gugel et al. | |
| 6,247,720 | B1 * | 6/2001 | Linger et al. | 280/441 |
| 6,264,083 | B1 | 7/2001 | Pavlick et al. | |
| 6,264,220 | B1 | 7/2001 | Pierce et al. | |
| 6,474,245 | B2 * | 11/2002 | Richard | 108/54.1 |
| 6,581,920 | B1 | 6/2003 | Smith et al. | |
| 6,615,973 | B2 | 9/2003 | Fritter | |
| 6,629,654 | B2 * | 10/2003 | Neely et al. | 241/30 |
| 6,666,362 | B1 | 12/2003 | LeTrudet | |
| 6,736,265 | B2 | 5/2004 | Kipper et al. | |
| 6,786,374 | B2 | 9/2004 | Schlecht | |
| 6,814,362 | B2 * | 11/2004 | Hanson et al. | 280/79.3 |
| 6,932,406 | B2 | 8/2005 | Waye | |
| 6,935,641 | B2 | 8/2005 | Hahn | |

(Continued)

*Primary Examiner* — Katy M Ebner
*Assistant Examiner* — Brodie Follman
(74) *Attorney, Agent, or Firm* — Nelson Mullins Riley & Scarborough, LLP

(57) ABSTRACT

A tool cart assembly including a tool cart having a horizontal surface defining a mounting aperture, a first rail including a bottom wall, a pair of opposed sidewalls, a front edge of each sidewall defining a catch, and at least one projection depending downwardly from the bottom wall, the projection being configured to be received in the mounting aperture such that the first rail is secured to the horizontal surface. A tool kit includes a sidewall and a first elongated rib, the elongated rib is configured to be slidably received by the first rail. The tool kit is removably secured to the tool cart by positioning the elongated first rib in the first rail and sliding the tool kit rearwardly such that the catches defined by the first rail engage a first portion of the tool kit.

18 Claims, 7 Drawing Sheets

U.S. PATENT DOCUMENTS

| | | | |
|---|---|---|---|
| 7,017,254 B2 * | 3/2006 | Guillot | 29/469.5 |
| 7,048,320 B2 | 5/2006 | Rubel et al. | |
| 7,165,702 B1 | 1/2007 | Billberg | |
| 7,204,374 B2 | 4/2007 | Marek | |
| 7,487,981 B2 * | 2/2009 | Cromie | 280/79.11 |
| 7,740,329 B2 * | 6/2010 | Hsiung et al. | 312/334.4 |
| 2002/0100396 A1 * | 8/2002 | Richard | 108/54.1 |
| 2004/0051016 A1 * | 3/2004 | Schnabel et al. | 248/224.8 |
| 2004/0194333 A1 * | 10/2004 | Allen | 33/638 |
| 2004/0222176 A1 * | 11/2004 | Campbell et al. | 211/94.01 |
| 2004/0251227 A1 * | 12/2004 | Perkins et al. | 211/189 |
| 2005/0006539 A1 * | 1/2005 | Fischer et al. | 248/220.42 |
| 2005/0269792 A1 | 12/2005 | Aronson | |
| 2006/0021985 A1 | 2/2006 | Jasper | |
| 2007/0012636 A1 * | 1/2007 | Wisnoski et al. | 211/70.6 |
| 2007/0137532 A1 * | 6/2007 | Cromie | 108/57.15 |
| 2007/0210021 A1 * | 9/2007 | Whitehead et al. | 211/70.6 |
| 2008/0296245 A1 * | 12/2008 | Punzel et al. | 211/153 |
| 2010/0300996 A1 * | 12/2010 | Kao | 211/70.6 |
| 2011/0107704 A1 * | 5/2011 | Kim | 52/483.1 |
| 2011/0168651 A1 * | 7/2011 | Stenftenagel et al. | 211/42 |
| 2012/0131872 A1 * | 5/2012 | Kim | 52/483.1 |
| 2012/0199708 A1 * | 8/2012 | Convey | 248/201 |
| 2012/0247044 A1 * | 10/2012 | Barkdoll et al. | 52/311.1 |

* cited by examiner

TOOL KIT MOUNTING SYSTEM

FIELD OF THE INVENTION

The present invention relates generally to portable tool kits. More particularly, the present invention relates to a system for releasably mounting a tool kit to a horizontal surface.

BACKGROUND OF THE INVENTION

Frequently, tool kits used by governmental agencies, such as the military, fire departments, police departments, etc., are required to meet specifications for durability, strength, capacity, etc. Frequently, these tool kits have to be able to contain a full complement of tools to conduct a wide range of repairs in the field. As such, the tool kits tend to be both large and heavy. Moreover, to meet durability requirements, the tool kits often have external ribs disposed along the outer surfaces of their walls to lend rigidity to the kits. Additionally, the ribs often protect various components of the tool kits, such as hinges, latches, etc., from damage.

In use, it is common for these tool kits to be placed on elevated surfaces, such as the tops of benches, tool carts, etc., to facilitate access by the user. The act of placing the tool kits on these surfaces can prove problematic because of the size and weight of the tool kits, which often exceed 150 lbs when loaded with tools. As well, even after a tool kit is placed on an elevated surface, the tool kit can be a hazard if not positioned properly. More specifically, the tool kit can fall off the elevated surface or cause the entire component on which it is placed, such as a tool cart, to tip over.

The present invention recognizes and addresses considerations of prior art constructions and methods.

SUMMARY OF THE INVENTION

One embodiment of the present invention provides a tool cart assembly including a tool cart assembly having a horizontal surface defining at least one mounting aperture therein, a first rail including a bottom wall, a pair of opposed sidewalls depending upwardly therefrom and defining a channel, a front edge of each sidewall defining a catch, and at least one projection depending downwardly from a bottom surface of the bottom wall. The at least one projection is configured to be received in the at least one mounting aperture of the horizontal surface such that the first rail is removably secured to the horizontal surface. A tool kit includes a sidewall and at least a first elongated rib disposed along an outer surface of the sidewall, the at least one elongated rib is configured to be slidably received by the first rail. The tool kit is removably secured to the tool cart by positioning the at least one elongated first rib of the tool kit in the channel defined by the first rail and sliding the tool kit rearwardly relative to the first rail such that the catches defined by the sidewalls of the first rail engage a first portion of the tool kit.

Another embodiment of the present invention provides a system for mounting a tool kit including an elongated rib and a lip to a horizontal surface defining a mounting aperture, having a first rail including a bottom wall, a pair of opposed sidewalls depending upwardly therefrom and defining a channel, a front edge of each sidewall defining a catch, and at least one projection depending downwardly from a bottom surface of the bottom wall, the at least one projection being configured to be received in and engage the at least one mounting aperture of the horizontal surface such that the first rail is removably secured to the horizontal surface. The tool kit is removably secured to the tool cart by engaging the lip of the tool kit with the catches of the first rail when the elongated rib is received in the channel defined by the first rail.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
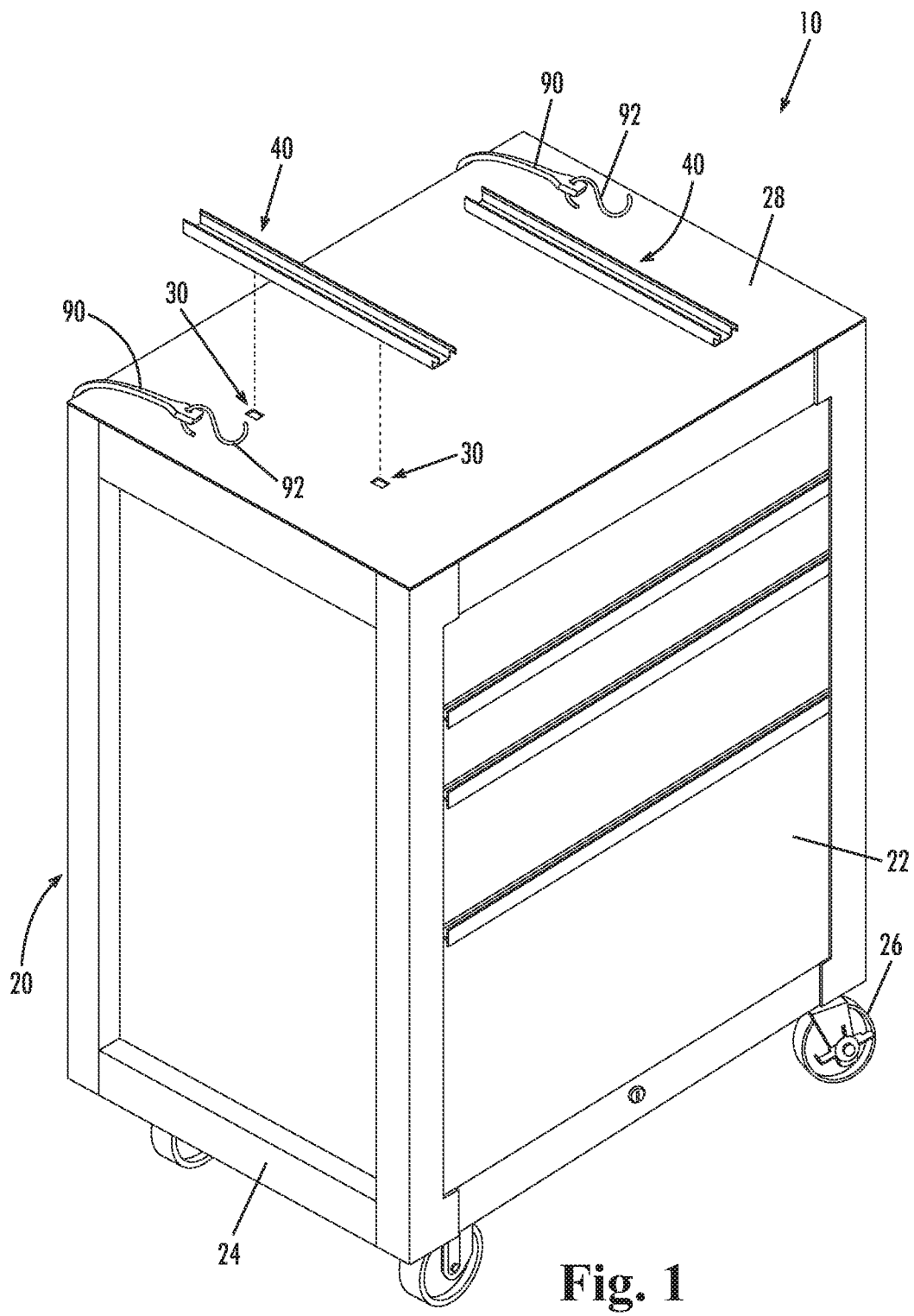
FIG. 1 is a perspective view of a tool cart and a tool kit mounting system in accordance with the present invention.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIGS. 1 and 2A through 2D, a tool cart assembly 10 including a tool kit mounting system in accordance with the present invention is shown. The tool kit mounting system includes a pair of elongated rails 40 and a pair of elastic cords such as, for example, bungee straps 90. The tool kit mounting system is configured to facilitate removably securing a tool kit 60 (FIG. 4) to a horizontal surface such as, but not limited to, a top wall 28 of a tool cart 20. As shown, tool cart 20 includes a plurality of drawers 22 slidably received within a frame 24, and wheels 26 disposed at bottom corners of frame 24. Additionally, top wall 28 of tool cart 20 defines two pairs of mounting apertures 30, each pair of mounting apertures 30 is configured to removably receive a corresponding rail 40 of the tool kit mounting system, as discussed in greater detail below.

Figure 2A:
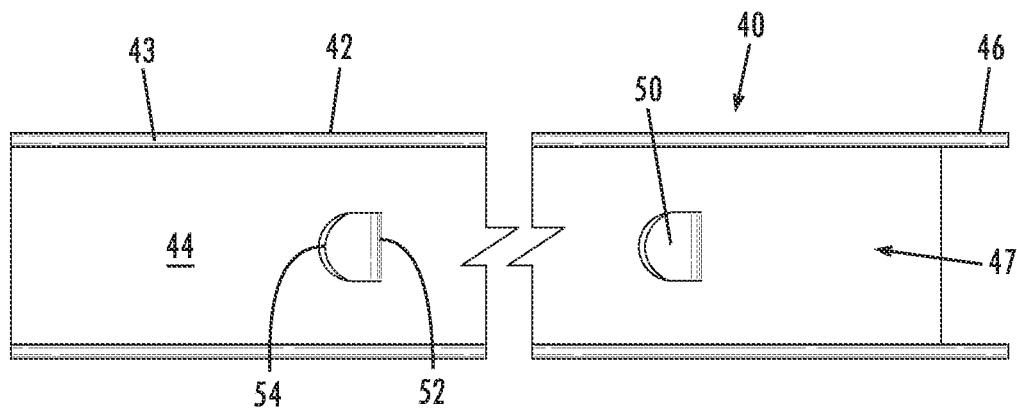
FIGS. 2A, 2B, 2C and 2D are top, side, bottom and front views, respectively, of the tool kit mounting system shown in FIG. 1.
Figure 2B:
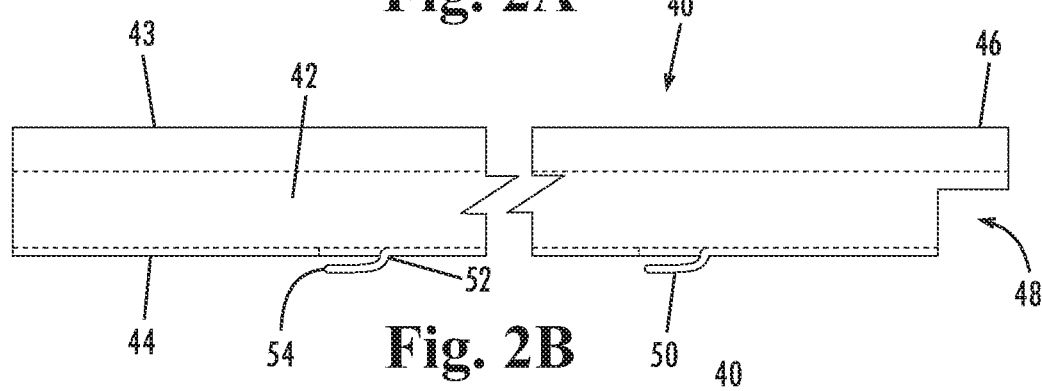
Figure 2C:
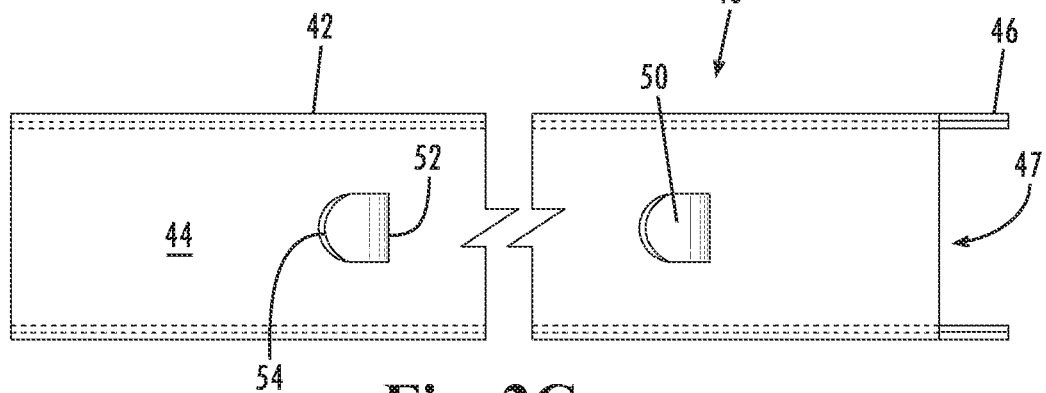
Figure 2D:
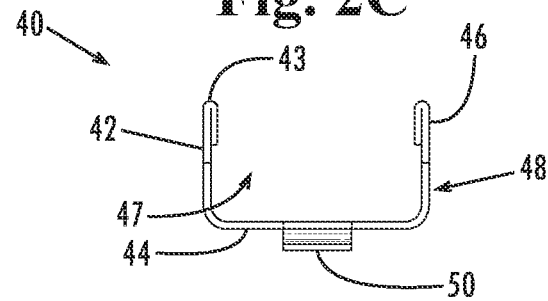

Referring now to FIGS. 2A, 2B, 2C and 2D, top, side, bottom and front views, respectively, of an elongated rail 40 of the tool kit mounting system are shown. Rails 40 of the tool kit mounting system are identical and, as such, only one rail is described herein. As best seen in FIG. 2A, rail 40 includes a pair of opposed, parallel sidewalls 42. A substantially planar bottom wall 44 extends between sidewalls 42 and is perpendicular to each, thereby forming a channel 47 between the pair of sidewalls 42. A catch 46 depends outwardly from the top portion of a front edge of each sidewall 42 such that each sidewall 42 defines a notch 48 adjacent the bottom portion of its front edge. In the embodiment shown, a top edge 43 of each sidewall 42 is formed by folding over an upper-most portion if each sidewall 42. As such, upper edges 43 of sidewalls 42 enhance structural rigidity of each rail 40.

Bottom wall 44 defines a pair of rearwardly depending tabs 50 that depend outwardly from a bottom surface of bottom wall 44 and are configured to be inserted in corresponding mounting apertures 30. In the embodiment shown, each tab 50 depends rearwardly from a front portion 52 that is integral to bottom wall 44. An inner surface of each tab 50 is separated from the bottom surface of bottom wall 44 such that each tab 50 and bottom wall 44 are configured to slidably receive a portion of a mounting surface therebetween, as discussed in greater detail below. As shown, each tab 50 is unitarily formed from the corresponding rail 40 by a portion of bottom wall 44, such as by a stamping process. Note, however, in alternate embodiments, the tabs may be formed separately and affixed to bottom wall 44 by welding, staking, fasteners, etc. Moreover, alternate embodiments may include variously configured projections, such as posts, that are configured to engage mounting apertures 30.

Figure 3A:
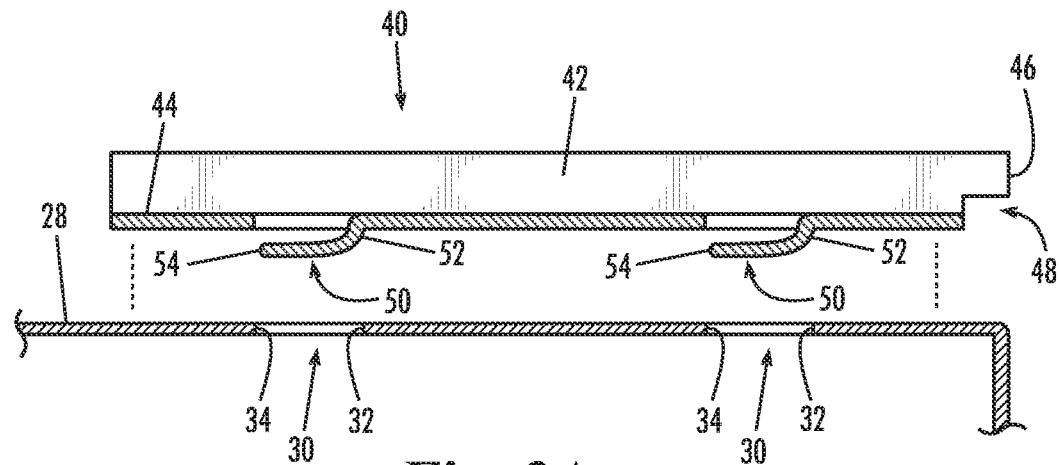
FIGS. 3A through 3C are partial cross-sectional views of the tool cart and tool kit mounting system shown in FIG. 1, showing sequential steps in mounting the tool kit mounting system to the tool cart.
Figure 3B:
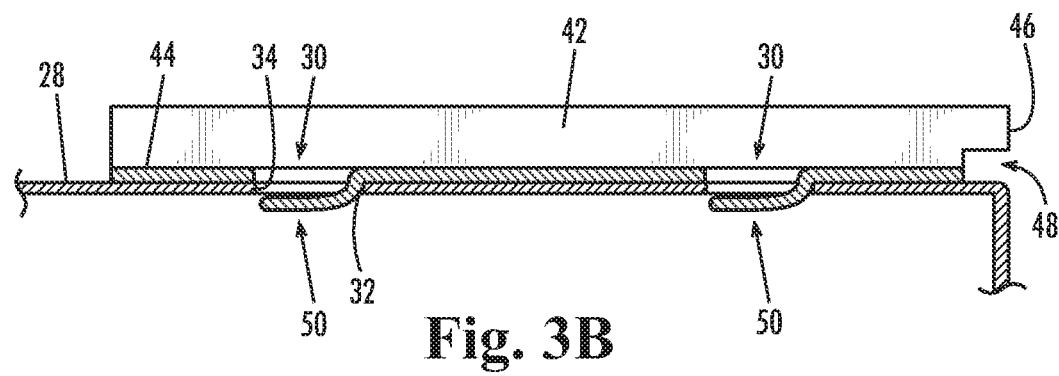
Figure 3C:
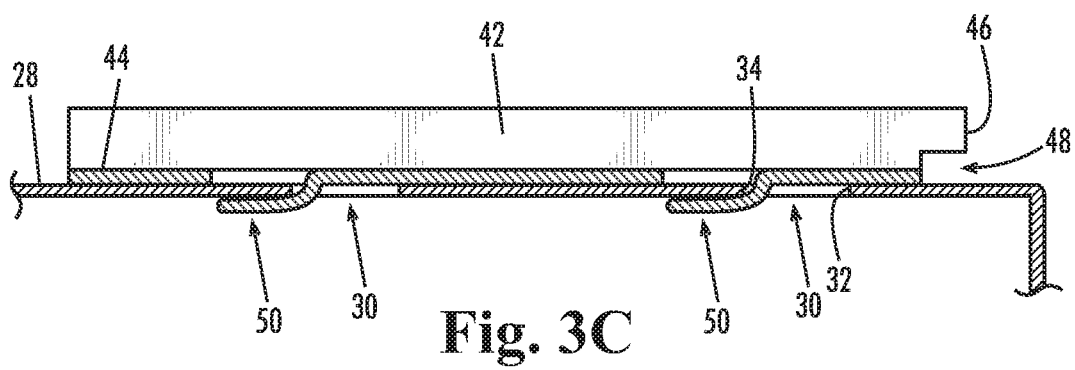

Referring now to FIG. 3A through 3C, to mount each rail 40 of the tool kit mounting system to the corresponding horizontal support surface, in the instant case that being top wall 28 of tool cart 20 shown in FIG. 1, the pair of tabs 50 is aligned above the corresponding pair of mounting apertures 30 defined by top wall 28. As shown in FIG. 3B, each tab 50 is inserted in the corresponding mounting aperture 30 such that the bottom surface of bottom wall 44 abuts the top surface of top wall 28, and front portion 52 and rear portion 54 of each tab 50 are adjacent a front edge 32 and a rear edge 34, respectively, of corresponding mounting aperture 30. As shown in FIG. 3C, rail 40 is urged rearwardly such that each tab 50 slidably receives a portion of top wall 28 between an inner surface of each tab 50 and the bottom surface of bottom wall 44. In this position, catch 46 of each sidewall 42 cooperates with top wall 28 of tool cart 20 to define a notch 48 that is configured to slidably receive a portion of tool kit 60 (FIG. 4) when it is removably secured to tool cart 20, as discussed in greater detail below. Preferably, the width of the gap defined by the inner surface of each tab 50 and the bottom surface of bottom wall 44 is substantially the same as the width of the portion of top wall 28 that is slidably received therein. As such, each tab 50 frictionally "grips" the portion of top wall 28 received therein such that each rail 40 is securely, yet removably, mounted on top wall 28. Where necessary, a tool such as a rubber mallet, or like tool, can be used to urge each rail 40 rearwardly when mounting the rails to the top wall of the tool cart. The tool kit mounting system is now configured to removably receive the corresponding tool kit.

Figure 4:
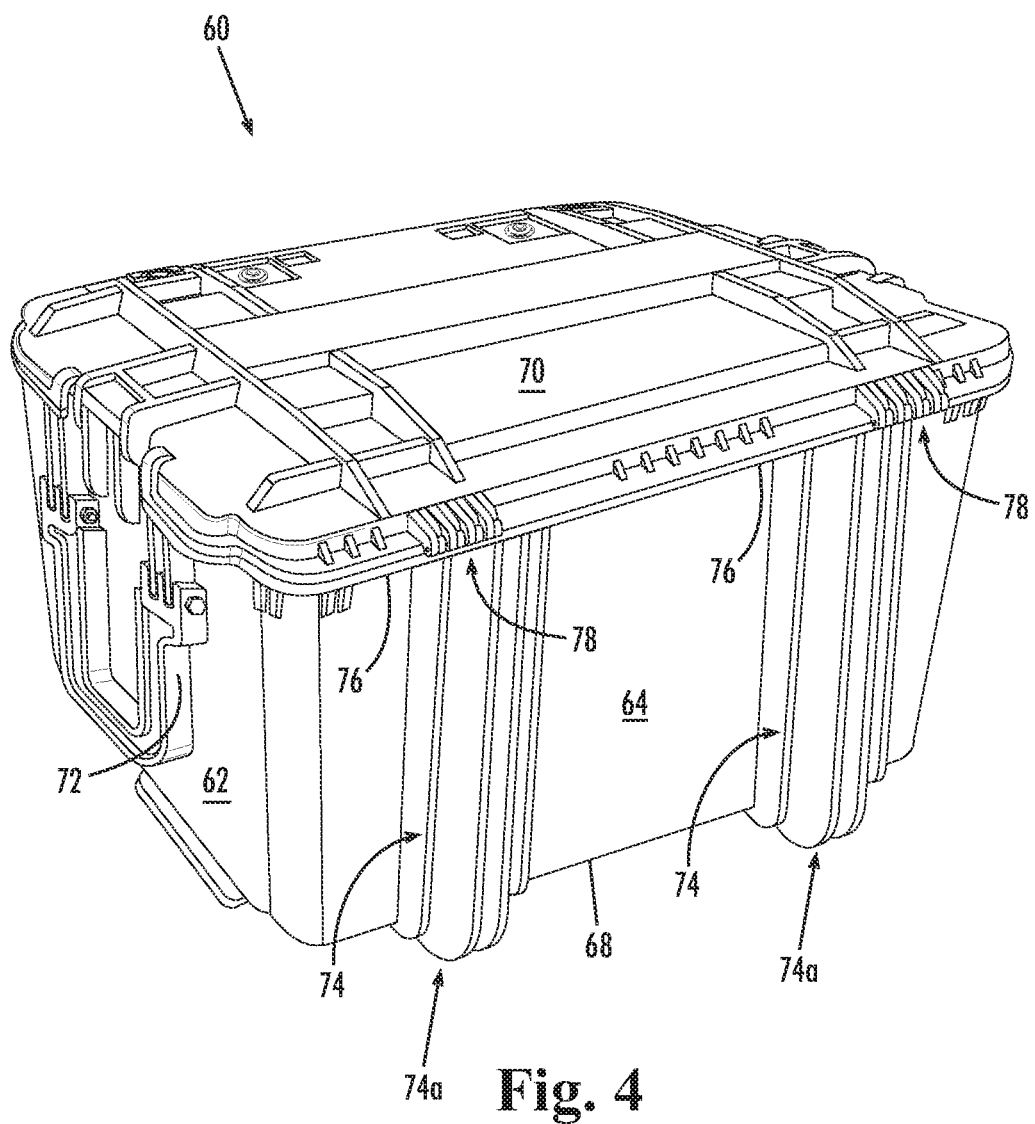
FIG. 4 is a perspective view of a portable tool kit.

Referring now to FIGS. 4 through 7, mounting a tool kit to a corresponding support surface with the disclosed tool kit mounting system is addressed. An example tool kit 60 for use with the present tool kit mounting system is shown in FIG. 4. Tool kit 60 includes a pair of sidewalls 62, a front wall 64 and a back lid 66, each extending upwardly from a bottom wall 68. A top wall 70 of tool kit 60 is pivotably connected to an upper edge of front wall 64 by a pair of hinges 78. A handle 72 is pivotably mounted to each sidewall 62 adjacent its top edge to facilitate lifting tool kit 60. Additionally, a pair of elongated ribs 74 extend along the outer surface of front wall 64 from its lower edge adjacent bottom wall 68 to its top edge adjacent top lid 70. Preferably, a downwardly depending lip 76 extends along the length of the top edge of front wall 64 between the opposed pair of sidewalls 62. Such elongated ribs 74 and lips 76 are known in the art to lend rigidity to tool kits, protect components such as hinges 78, etc., especially with tool kits that are often used by governmental agencies, such as the military, fire departments, police departments, etc.

Figure 5A:
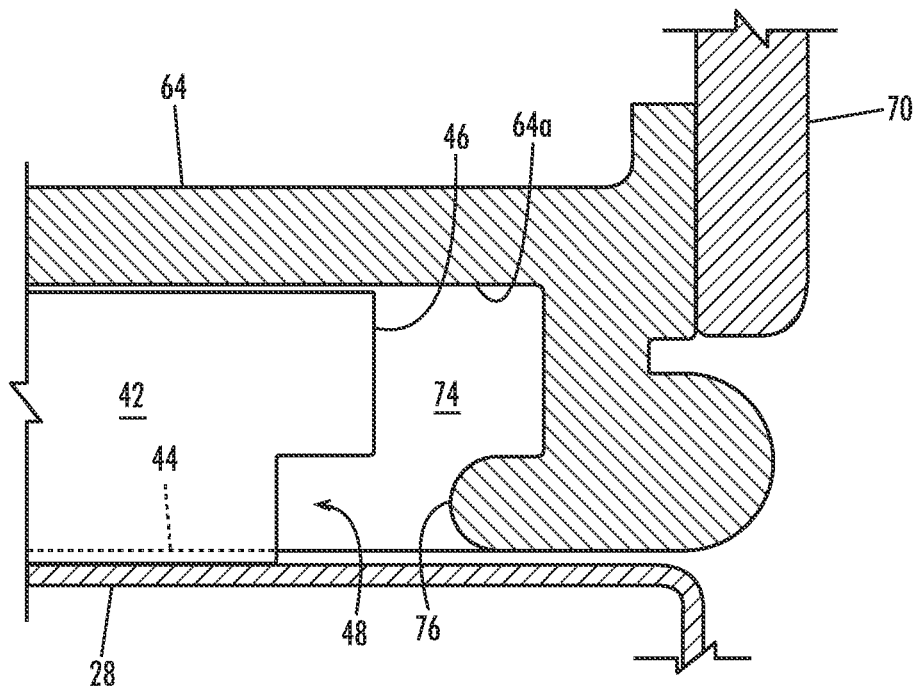
FIGS. 5A and 5B are partial cross-sectional views of the tool cart and the tool kit mounting system shown in FIG. 1, and the tool kit shown in FIG. 4, taken along line 5-5 of FIG. 6.
Figure 7:
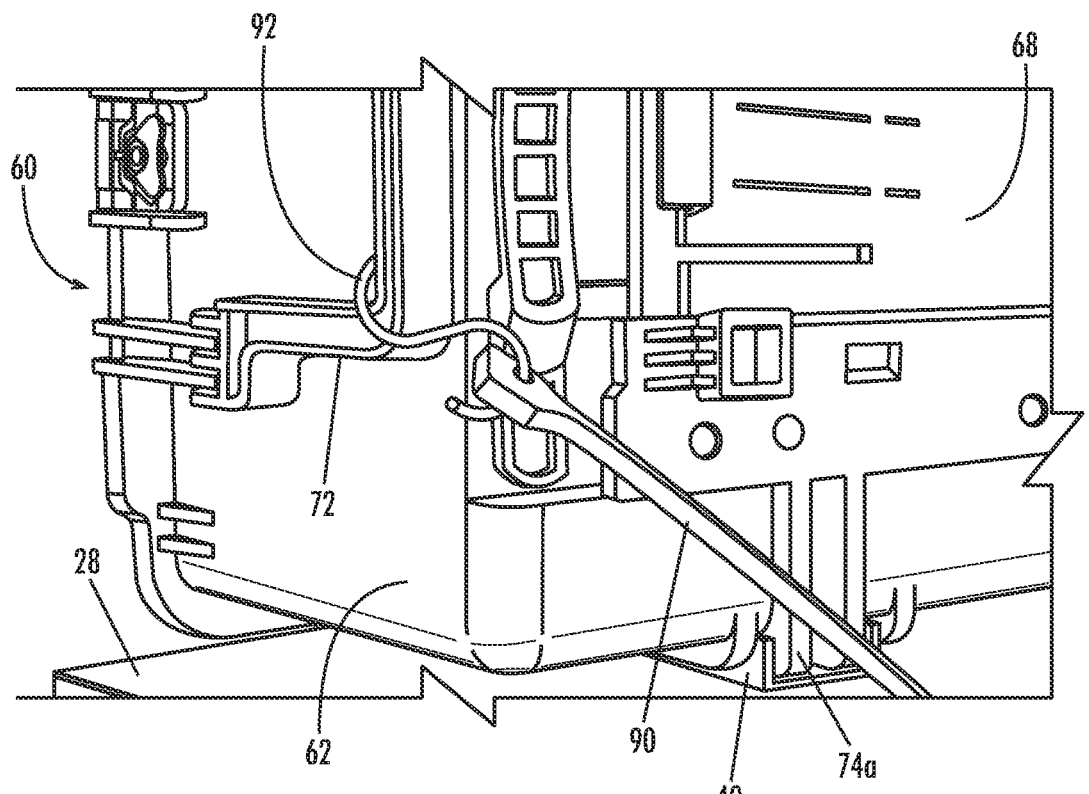
FIG. 7 is a partial perspective rear view of the tool kit mounted to the tool cart, as shown in FIG. 6, with the tool kit mounting system.

For the embodiment shown, to mount tool kit 60 to top surface 28 of tool cart 20, tool kit 60 is lifted such that elongated ribs 74 are each disposed, at least partially, above a corresponding rail 40. As shown in FIG. 7, each elongated rib 74 extends at least partially along the bottom surface of bottom wall 68, thereby forming a bottom corner 74a on each elongated rib 74. Next, tool kit 60 is lowered such that bottom corner 74a of each elongated rib 74 is received within the channel formed by opposed sidewalls 42 of each rail 40. Preferably, each bottom corner 74a is received in each rail 40 closer to the back end than the front end of each rail. Next, tool kit 60 is tilted forwardly such that front wall 64 moves downwardly toward top wall 28 of tool cart 20 and each elongated rib 74 is therefore received between sidewalls 42 of the corresponding rail, as best seen in FIG. 5A. As shown, the outermost surface of each elongated rib 74 abuts the top surface of bottom wall 44 of the corresponding ribs 74. Note, however, in alternate embodiments the outer surface 64a of front wall 64 abuts top edges 43 of the corresponding rail 40 such that each elongated rib 74 is supported slightly above the top surface of bottom wall 44.

Figure 5B:
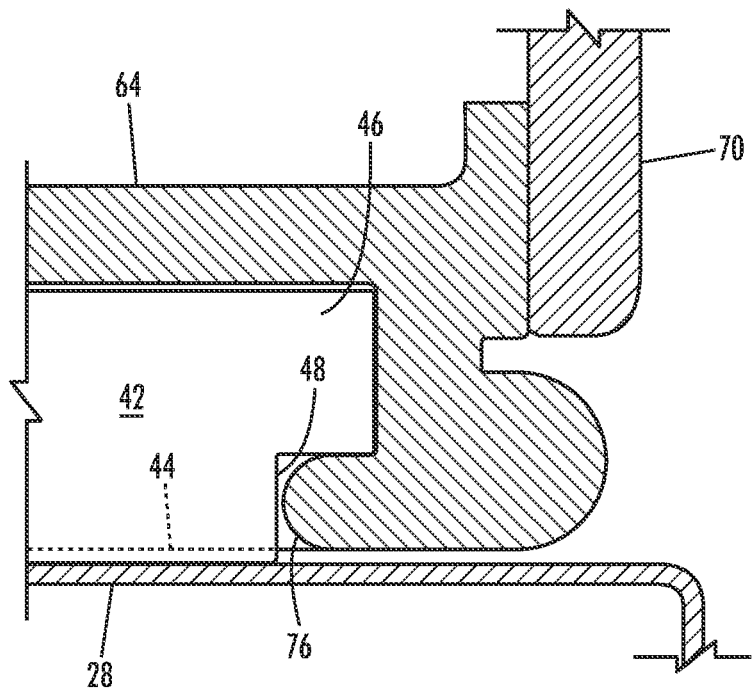
Figure 6:
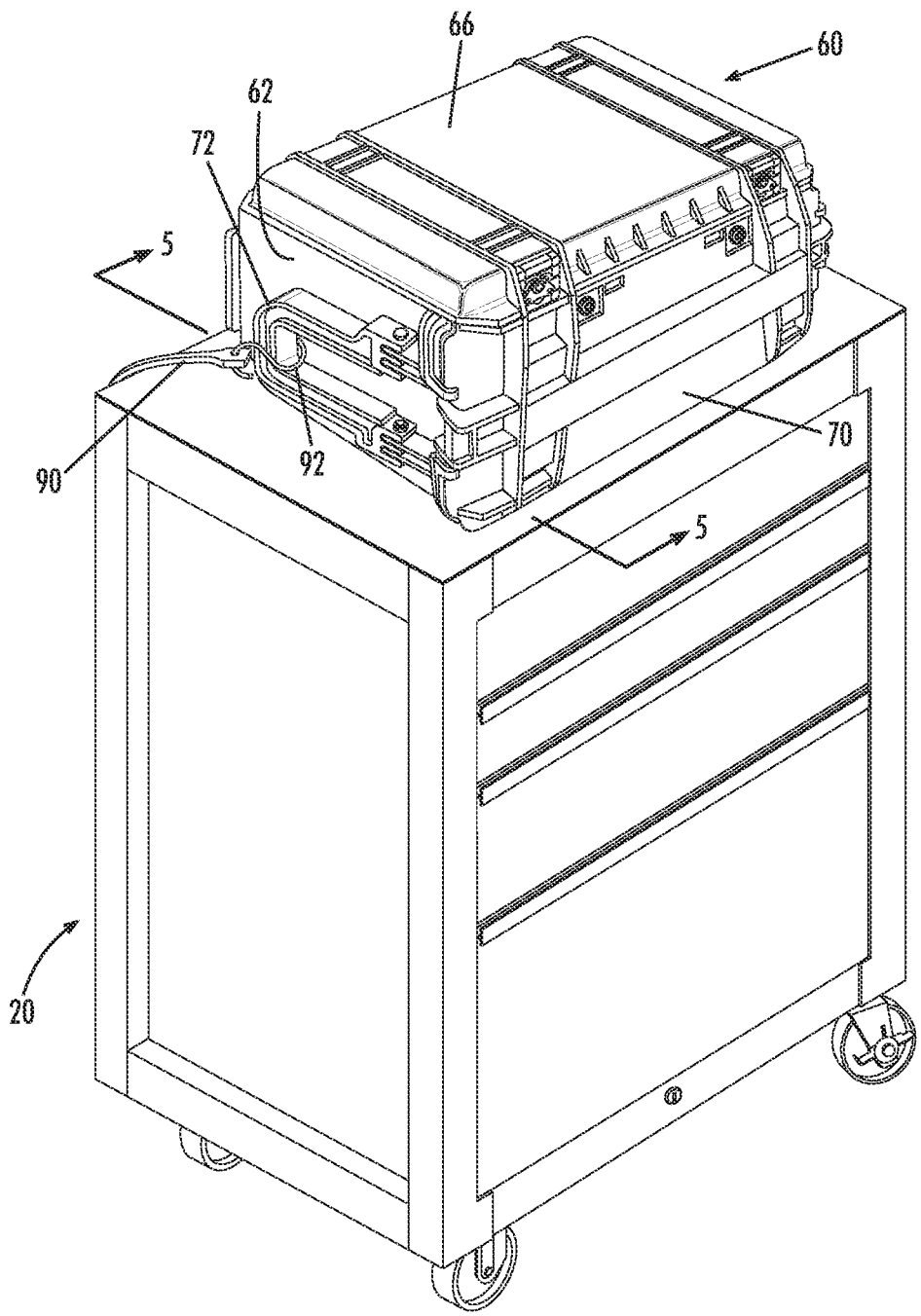
FIG. 6 is a front perspective view of the tool kit, shown in FIG. 4, mounted to the tool cart, shown in FIG. 1, with the tool kit mounting system.

As shown in FIG. 5B, tool kit 60 is slid rearwardly relative to top wall 28 of tool cart 20 until lip 76 of tool kit 60 is slidably received in notches 48 defined by top wall 28 and catches 46 of each guide rail 40. So positioned, catches 46 engage corresponding portions of lip 76, thereby preventing upward rotation of tool kit 60 relative to top wall 28 of tool cart 20. As best seen in FIGS. 6 and 7, a pair of hooks, each disposed on a free end of a corresponding bungee strap 90, are engaged with a corresponding handle 72 of tool kit 60. The opposite end of each bungee strap 90 includes a hook (92) that engages a portion of the tool cart to removably attach each bungee strap 90. Alternate embodiments may include bungee straps that are affixed to the corresponding tool cart with threaded fasteners, rivets, etc. Bungee straps 90 provide rearward biasing force that helps insure catches 46 of each guide rail 40 remain engaged with lip 76 of tool kit 60 until it is desired to remove tool kit 60 from tool cart 20. Although it is preferable to retain tool kit 60 with elasticized straps, such as bungee straps 90, the straps need not be elasticized in all embodiments. As well, the straps used to retain the tool kit may be connected to portions of tool kit 60 other than handles 72.

While one or more preferred embodiments of the invention are described above, it should be appreciated by those skilled in the art that various modifications and variations can be made in the present invention without departing from the scope and spirit thereof. For example, alternate embodiments may include rails that are affixed to a horizontal surface with threaded fasteners, rivets, welding, etc. It is intended that the present invention cover such modifications and variations as come within the scope and spirit of the appended claims and their equivalents.

What is claimed is:

1. A tool cart assembly, comprising:
a tool cart including a horizontal surface defining at least one mounting aperture therein;
a first rail including a bottom wall, a pair of opposed sidewalls depending upwardly therefrom and defining a channel, a front edge of each sidewall defining a catch, and at least one projection depending downwardly from a bottom surface of the bottom wall, the at least one projection being configured to be received in the at least one mounting aperture of the horizontal surface such that the first rail is removably secured to the horizontal surface; and
a tool kit including a sidewall and at least a first elongated rib disposed along an outer surface of the sidewall, the at least one elongated rib being configured to be slidably received by the first rail,
wherein the tool kit is removably secured to the tool cart by positioning the at least one elongated first rib of the tool kit in the channel defined by the first rail and sliding the tool kit rearwardly relative to the first rail such that the catches defined by the sidewalls of the first rail engage a first portion of the tool kit.

2. The tool cart assembly of claim 1, wherein the at least one mounting aperture of the tool cart's horizontal surface further comprises a first pair of mounting apertures, the at least one projection of the first rail further comprises a first pair of projections, and the first pair of projections is received by the first pair of mounting apertures such that the first rail is removably secured to the tool cart.

3. The tool cart assembly of claim 2, wherein each projection of the first pair of projections further comprise a rearwardly depending tab that is substantially parallel to the bottom surface of the bottom wall such that a portion of the horizontal surface of the tool cart is slidably received between each tab and the bottom wall of the first rail.

4. The tool cart assembly of claim 3, wherein the first portion of the tool kit that is engaged by the catches of the first rail is a lip that is transverse to the elongated rib.

5. The tool cart assembly of claim 4, wherein each catch of the first rail projects outwardly from the front edge of the corresponding sidewall such that a notch is defined between each catch and the horizontal surface of the tool cart, each notch being adapted to slidably receive a portion of the lip of the tool kit.

6. The tool cart assembly of claim 4, further comprising a handle disposed on the tool kit.

7. The tool cart assembly of claim 6, further comprising:
a handle disposed on the tool kit;
an elongated member having a first end affixed to the tool cart and a second end that is configured to selectively engage the tool kit,
wherein the elongated member biases the tool kit rearwardly relative to the first rail such that the lip of the tool kit is biased into engagement notches of the first rail.

8. The tool cart assembly of claim 7, wherein the second end of the elongated member engages the handle of the tool kit.

9. The tool cart assembly of claim 8, wherein the elongated member further comprises one of a strap, a chain, a rope and a wire.

10. The tool cart assembly of claim 7, wherein the elongated member further comprises an elasticized strap.

11. The tool cart assembly of claim 3, further comprising:
a second pair of mounting apertures defined by the horizontal surface of the tool cart;
a second rail including a second pair of downwardly and rearwardly depending tabs that are configured to be received by the second pair of mounting apertures such that the second rail is removably secured to the tool cart's horizontal surface; and
a second elongated rib disposed on the outer surfaces of the sidewall of the tool kit,
wherein the first elongated rib is slidably received in the first rail and the second elongated rib is slidably received in the second rail.

12. The tool cart assembly of claim 11, wherein the first and second elongated ribs are substantially parallel.

13. A system for mounting a tool kit including an elongated rib and a lip to a tool cart having a horizontal surface including at least one mounting aperture, comprising:
a first rail including a bottom wall, a pair of opposed sidewalls depending upwardly therefrom and defining a channel, a front edge of each sidewall defining a catch, and at least one projection depending downwardly from a bottom surface of the bottom wall, the at least one projection being configured to be received in and engage the at least one mounting aperture of the horizontal surface such that the first rail is removably secured to the horizontal surface,
wherein the tool kit is removably secured to the tool cart by engaging the lip of the tool kit with the catches of the first rail when the elongated rib is received in the channel defined by the first rail.

14. The system of claim 13, wherein the at least one mounting aperture of the tool cart's horizontal surface further comprises a first pair of mounting apertures, the at least one projection of the first rail further comprises a first pair of projections, and the first pair of projections is received by the first pair of mounting apertures such that the first rail is removably secured to the tool cart.

15. The system of claim 14, wherein each projection of the first pair of projections further comprise a rearwardly depending tab that is substantially parallel to the bottom surface of the bottom wall such that a portion of the horizontal surface of the tool cart is slidably received between each tab and the bottom wall of the first rail.

16. The system of claim 14, further comprising:
a handle disposed on the tool kit; and
a strap having a first end affixed to the tool cart and a second end that is configured to selectively engage the handle of the tool kit,
wherein the strap biases the tool kit rearwardly relative to the first rail such that the lip of the tool kit is biased into engagement with notches of the first rail.

17. The system of claim 14, further comprising:
a second pair of mounting apertures defined by the horizontal surface of the tool cart;
a second rail including a second pair of downwardly depending projection configured to be received by and engage the second pair of mounting apertures such that the second rail is removably secured to the tool cart's horizontal surface; and
a second elongated rib disposed on the outer surfaces of the sidewall of the tool kit,
wherein the first elongated rib is slidably received in the first rail and the second elongated rib is slidably received in the second rail.

18. The system of claim 13, wherein each catch of the first rail projects outwardly from the front edge of the corresponding sidewall such that a notch is defined between each catch and the horizontal surface of the tool cart, each notch being adapted to slidably receive a portion of the lip of the tool kit.

* * * * *

UNITED STATES PATENT AND TRADEMARK OFFICE
CERTIFICATE OF CORRECTION

PATENT NO. : 8,454,036 B2  
APPLICATION NO. : 13/109474  
DATED : June 4, 2013  
INVENTOR(S) : Charles Henry Cowie et al.

It is certified that error appears in the above-identified patent and that said Letters Patent is hereby corrected as shown below:

In the Specification

At column 3, line 16 of the printed patent, please change "if each sidewall" to -- of each sidewall --

In the Claims

Column 5, line 55 (claim 7, line 8) please change "engagement notches" to -- engagement with notches --

Signed and Sealed this  
Thirty-first Day of December, 2013

Margaret A. Focarino  
*Commissioner for Patents of the United States Patent and Trademark Office*